United States Patent
Lee et al.

(10) Patent No.: US 9,342,178 B2
(45) Date of Patent: May 17, 2016

(54) TOUCH SENSOR INTEGRATED TYPE DISPLAY DEVICE

(71) Applicant: LG Display Co., Ltd., Seoul (KR)

(72) Inventors: Deuksu Lee, Gyeonggi-do (KR);
Jonghee Hwang, Gyeonggi-do (KR);
Seungrok Shin, Gyeonggi-do (KR);
Taeyun Kim, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 14/580,637

(22) Filed: Dec. 23, 2014

(65) Prior Publication Data

US 2016/0041666 A1 Feb. 11, 2016

(30) Foreign Application Priority Data

Aug. 11, 2014 (KR) .................... 10-2014-0103982

(51) Int. Cl.
*G06F 3/045* (2006.01)
*G06F 3/041* (2006.01)
*G06F 3/047* (2006.01)
*G06F 3/044* (2006.01)

(52) U.S. Cl.
CPC .............. *G06F 3/0412* (2013.01); *G06F 3/044* (2013.01); *G06F 3/045* (2013.01); *G06F 3/047* (2013.01)

(58) Field of Classification Search
None
See application file for complete search history.

(56) References Cited

U.S. PATENT DOCUMENTS

| | | | |
|---|---|---|---|
| 8,970,537 B1* | 3/2015 | Shepelev | G06F 3/044 178/18.01 |
| 9,081,453 B2* | 7/2015 | Bulea | G06F 3/044 |
| 2009/0002336 A1 | 1/2009 | Choi et al. | |
| 2010/0085326 A1* | 4/2010 | Anno | 345/174 |
| 2010/0144391 A1* | 6/2010 | Chang et al. | 455/566 |
| 2010/0231531 A1* | 9/2010 | Yang et al. | 345/173 |
| 2010/0321326 A1* | 12/2010 | Grunthaner et al. | 345/174 |
| 2013/0106747 A1* | 5/2013 | Choi et al. | 345/173 |
| 2013/0194232 A1* | 8/2013 | Imamura et al. | 345/174 |
| 2014/0111709 A1* | 4/2014 | Kim | G02F 1/13338 349/12 |

FOREIGN PATENT DOCUMENTS

EP 2 492 784 A2 8/2012

OTHER PUBLICATIONS

Communication dated Dec. 8, 2015 from the European Patent Office in counterpart European application No. 15178790.0.

* cited by examiner

*Primary Examiner* — Srilakshmi K Kumar
*Assistant Examiner* — Stephen T Reed
(74) *Attorney, Agent, or Firm* — Morgan, Lewis & Bockius LLP

(57) ABSTRACT

A touch sensor integrated type display device includes gate and data lines, pixel electrodes, and touch electrodes arranged in a matrix with a row direction and a column direction. The touch electrodes include 1-1, 1-2, 2-1, and 2-2 touch electrodes respectively connected to 1-1, 1-2, 2-1, and 2-2 touch routing wires. The 1-1 touch routing wire connect 1-1 touch electrodes and is arranged in the row direction. The 2-1 touch routing wires are respectively connected to 2-1 touch electrodes and arranged in the column direction. The 1-2 touch routing wire connects 1-2 touch electrodes and is arranged parallel to the 1-1 touch routing wire. The 2-2 touch routing wire connects 2-2 touch electrodes and is arranged parallel to the 2-1 touch routing wire.

11 Claims, 12 Drawing Sheets ized display device at a low price and have high display quality (including capability of representing a motion picture, a resolution, brightness, a contrast ratio, a color representation capability, etc.), have been developed in accordance with the need for display devices capable of properly displaying the multimedia with the development of multimedia. Various input devices, such as a keyboard, a mouse, a track ball, a joystick, and a digitizer, have been used in the display devices to allow users to interface with the display devices.

TOUCH SENSOR INTEGRATED TYPE DISPLAY DEVICE

This application claims the benefit of priority under 35 U.S.C. §119(a) to Korean Patent Application No. 10-2014-0103982 filed on Aug. 11, 2014, which is incorporated by reference herein in its entirety.

BACKGROUND OF THE INVENTION

1. Field of the Invention

The present invention relates to a touch sensor integrated type display device, and more particularly, to a touch sensor integrated type display device capable of improving touch sensitivity while reducing the number of touch routing wires.

2. Discussion of the Related Art

In recent years, flat panel displays (hereinafter referred to as "display devices"), which are able to be manufactured as a large-sized display device at a low price and have high display quality (including capability of representing a motion picture, a resolution, brightness, a contrast ratio, a color representation capability, etc.), have been developed in accordance with the need for display devices capable of properly displaying the multimedia with the development of multimedia. Various input devices, such as a keyboard, a mouse, a track ball, a joystick, and a digitizer, have been used in the display devices to allow users to interface with the display devices.

However, when the user makes use of these input devices, the user's dissatisfaction increases because the user is required to learn how to use the input devices and the input devices occupy space, thereby having difficulty in increasing the perfection of products. Thus, a demand for a convenient and simple input device for the display device capable of reducing erroneous operations is increasing. In response to the increased demand, a touch sensor has been proposed to recognize information when the user inputs the information by directly touching the screen or approaching the screen with his or her hand or a pen while he or she watches the display device.

The touch sensor has a simple configuration capable of reducing the erroneous operations. The user can also perform an input action without using a separate input device and can quickly and easily manipulate a display device through the contents displayed on the screen. Thus, the touch sensor has been applied to various display devices.

The touch sensor used in display devices may be classified into an add-on type touch sensor, an on-cell type touch sensor, and an integrated type (or in-cell type) touch sensor depending on its structure. The add-on type touch sensor is configured such that the display device and a touch sensor module including the touch sensor are individually manufactured and then the touch sensor module is attached to an upper substrate of the display device. The on-cell type touch sensor is configured such that elements constituting the touch sensor are directly formed on the surface of an upper glass substrate of the display device. The in-cell type touch sensor is configured such that elements constituting the touch sensor are mounted inside the display device to thereby achieve thin profile of the display device and increase the durability of the display device.

Among the above touch sensors, because the in-cell type touch sensor may commonly use a common electrode of the display device as a touch electrode, a thickness of the display device is decreased as compared to the other touch sensors. Further, because the touch elements of the in-cell type touch sensor are formed inside the display device, the durability of the display device may increase. Hence, the in-cell type touch sensor has been widely used.

The in-cell type touch sensor can solve the problems generated in the add-on type touch sensor and the on-cell type touch sensor because of the advantages of the thin profile and the durability improvement. The in-cell type touch sensor may be divided into a light type touch sensor and a capacitive touch sensor depending on a method for sensing a touched portion. The capacitive touch sensor may be subdivided into a self capacitive touch sensor and a mutual capacitive touch sensor.

The self capacitive touch sensor forms a plurality of independent patterns in a touch area of a touch sensing panel and measures changes in a capacitance of each independent pattern, thereby deciding whether or not a touch operation is performed. The mutual capacitive touch sensor crosses X-axis electrode lines (for example, driving electrode lines) and Y-axis electrode lines (for example, sensing electrode lines) in a touch electrode formation area of a touch sensing panel to form a matrix, applies a driving pulse to the X-axis electrode lines, and senses changes in voltages generated in sensing nodes defined as crossings of the X-axis electrode lines and the Y-axis electrode lines through the Y-axis electrode lines, thereby deciding whether or not a touch operation is performed.

In the mutual capacitive touch sensor, a mutual capacitance generated in touch recognition of the mutual capacitive touch sensor is very small, but a parasitic capacitance between gate line and data lines constituting the display device is very large. Therefore, it is difficult to accurately recognize a touch position because of the parasitic capacitance.

Further, because a plurality of touch driving lines for a touch drive and a plurality of touch sensing lines for a touch sensing have to be formed on the common electrode for the multi-touch recognition of the mutual capacitive touch sensor, the mutual capacitive touch sensor requires a very complex line structure.

On the other hand, because the self capacitive touch sensor has a simpler line structure than the mutual capacitive touch sensor, touch accuracy may increase. Hence, the self capacitive touch sensor has been widely used, if necessary or desired.

A related art liquid crystal display (hereinafter referred to as "touch sensor integrated type display device"), in which a self capacitive touch sensor is embedded, is described below with reference to FIG. 1. FIG. 1 is a plane view of a related art touch sensor integrated type display device.

As shown in FIG. 1, the touch sensor integrated type display device includes an active area AA, in which touch electrodes are formed and data is displayed, and a bezel area BA positioned outside the active area AA. In the bezel area BA, various wires and a touch integrated circuit (IC) 10 are formed.

The active area AA includes a plurality of touch electrodes Tx11-Tx14, Tx21-Tx24, Tx31-Tx34, Tx41-Tx44, and Tx51-T54 divided in a first direction (for example, x-axis direction) and a second direction (for example, y-axis direction) crossing the first direction and a plurality of touch routing wires TW11-TW14, TW21-TW24, TW31-TW34, TW41-TW44, and TW51-TW54, which are respectively connected to the plurality of touch electrodes Tx11-Tx14, Tx21-Tx24, Tx31-Tx34, Tx41-Tx44, and Tx51-T54 and are arranged in parallel with one another in the second direction.

The plurality of touch electrodes Tx11-Tx14, Tx21-Tx24, Tx31-Tx34, Tx41-Tx44, and Tx51-T54 inside the active area AA are formed by dividing a common electrode of the display device, and thus operate as common electrodes in a display drive for displaying data and operate as touch electrodes in a touch drive for recognizing a touch position.

The bezel area BA positioned outside the active area AA includes the touch IC 10 and various wires. In the display drive, a driving IC for the display device and the touch IC 10 drive gate lines (not shown) of the display device, supply display data to data lines (not shown), and supply a common voltage to the touch electrodes (or the common electrodes). In the touch drive, the touch IC 10 supplies a touch driving voltage to the touch electrodes and scans changes in a capacitance of each touch electrode before and after a touch operation, thereby determining a position of the touched touch electrode. The various wires include the touch routing wires TW11-TW14, TW21-TW24, TW31-TW34, TW41-TW44, and TW51-TW54 connected to the touch electrodes Tx11-Tx14, Tx21-Tx24, Tx31-Tx34, Tx41-Tx44, and Tx51-T54, the gate lines connected to the touch IC 10, and the data lines.

The related art touch sensor integrated type display device respectively connects the touch routing wires TW11-TW14, TW21-TW24, TW31-TW34, TW41-TW44, and TW51-TW54 to the touch electrodes Tx11-Tx14, Tx21-Tx24, Tx31-Tx34, Tx41-Tx44, and Tx51-T54. Thus, because one touch routing wire has to be connected to each touch electrode, the number of touch routing wires increases as the size of the display device becomes larger. For example, when touch electrodes each having a pitch of 4.3 mm are disposed in a 15.6-inch display device, about 80 touch electrodes of one line in a horizontal direction and about 45 touch electrodes of one line in a vertical direction are required. As a result, the total number of touch electrodes is about 3600, and the 3600 touch electrodes are connected to the touch IC 10 through 3600 touch routing wires, respectively. Because the touch IC 10 includes a circuit for driving each touch electrode, the manufacturing cost of the display device increases as the size of the touch IC 10 becomes larger.

Furthermore, when the number of touch routing wires increases as the size of the display device becomes larger, a parasitic capacitance between the touch routing wires and the gate and data lines of the display device increases. Hence, the touch sensitivity is reduced.

SUMMARY OF THE INVENTION

Accordingly, the present invention is directed to a touch sensor integrated type display device that substantially obviates one or more of the problems due to limitations and disadvantages of the related art.

An object of the present invention is to provide a touch sensor integrated type display device capable of preventing an increase in the size of a touch integrated circuit (IC) resulting from an increase in the size of the display device by reducing the number of touch routing wires and capable of improving touch sensitivity by reducing a parasitic capacitance between the touch routing wires and gate and data lines.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a touch sensor integrated type display device comprises a plurality of gate lines and a plurality of data lines which are arranged crossing each other; a plurality of pixel electrodes respectively disposed in pixel areas defined by the crossing of the plurality of gate lines and the plurality of data lines; a plurality of touch electrodes arranged in a matrix with a row direction and a column direction, each touch electrode overlapping at least one respective pixel electrode; a 1-1 touch routing wire arranged in the row direction and configured to connect 1-1 touch electrodes among the plurality of touch electrodes disposed on one row of an odd-numbered row and an even-numbered row, and one column of an odd-numbered column and an even-numbered column; a plurality of 2-1 touch routing wires arranged in the column direction and respectively connected to 2-1 touch electrodes disposed on the one row of the odd-numbered row and the even-numbered row, and another column of an odd-numbered column and an even-numbered column; a 1-2 touch routing wire arranged in parallel with the 1-1 touch routing wire and configured to connect 1-2 touch electrodes disposed on another row of the odd-numbered row and the even-numbered row, and the another column of an odd-numbered column and an even-numbered column; and at least one 2-2 touch routing wire arranged in parallel with the 2-1 touch routing wire and configured to connect 2-2 touch electrodes disposed on the another row of the even-numbered row and the odd-numbered row, and the another column of the odd-numbered column and the even-numbered column.

In another aspect, a touch sensor integrated type display device comprises a plurality of gate lines and a plurality of data lines which are arranged crossing each other; a plurality of pixel electrodes respectively disposed in pixel areas defined by the crossing of the plurality of gate lines and the plurality of data lines; a plurality of touch electrodes arranged in an oblique direction of a row direction and an oblique direction of a column direction, each touch electrode overlapping at least one respective pixel electrode, and including a first touch electrode and a second touch electrode surrounding the first touch electrode; a plurality of touch link lines configured to connect a predetermined number of first touch electrodes and form a plurality of groups of the first touch electrodes; a plurality of first touch routing wires which are respectively connected to the plurality of touch link lines and are arranged in the column direction; a plurality of second touch routing wires which connect the second touch electrodes arranged on one row of an odd-numbered row and an even-numbered row among the plurality of touch electrodes and are arranged in parallel with one another in the column direction; and a third touch routing wire which connects the second touch electrodes arranged on another row of odd-numbered row and the even-numbered row among the plurality of touch electrodes.

In yet another aspect, a touch sensor integrated type display device comprises a plurality of gate lines and a plurality of data lines which are arranged crossing each other; a plurality of pixel electrodes respectively disposed in pixel areas defined by the crossing of the plurality of gate lines and the plurality of data lines; a plurality of touch electrodes arranged in a matrix with a row direction and a column direction, each touch electrode overlapping at least one respective pixel electrode; a 1-1 touch routing wire arranged in the row direction configured to connect 1-1 touch electrodes among the plurality of touch electrodes, the 1-1 touch electrodes including alternating ones of the touch electrodes of one row; a plurality of 2-1 touch routing wires arranged in the column direction which are connected to respective ones of 2-1 touch electrodes, the 2-1 electrodes including a touch electrodes directly between respective ones of the 1-1 touch electrodes as well as alternating ones of the touch electrodes in the column direction; a 1-2 touch routing wire arranged parallel to the 1-1 touch routing wire and configured to connect 1-2 touch electrodes among the plurality of touch electrodes, the 1-2 touch electrodes including alternating ones of the touch electrodes of a row other than the row of the 1-1 touch electrodes such that 1-1 touch electrode and the 2-1 touch electrodes are disposed in respectively different columns; and at least one 2-2 touch routing wire arranged parallel to the 2-1 touch routing wire and configured to connect 2-2 touch electrodes, the 2-2 touch electrodes including every other touch electrode of a column corresponding to one of 1-1 touch electrodes such that the 2-2 touch electrodes are in a same row as the 1-2 touch electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Where possible, the same or like reference numbers may be used throughout the drawings to refer to the same or like parts. In the following description, a liquid crystal display (hereinafter referred to as "touch sensor integrated type display device"), in which a self capacitive touch sensor is embedded, is used as an example of a touch sensor integrated type display device. However, other examples of display devices may be used as a touch sensor integrated type display device.

Figure 2:
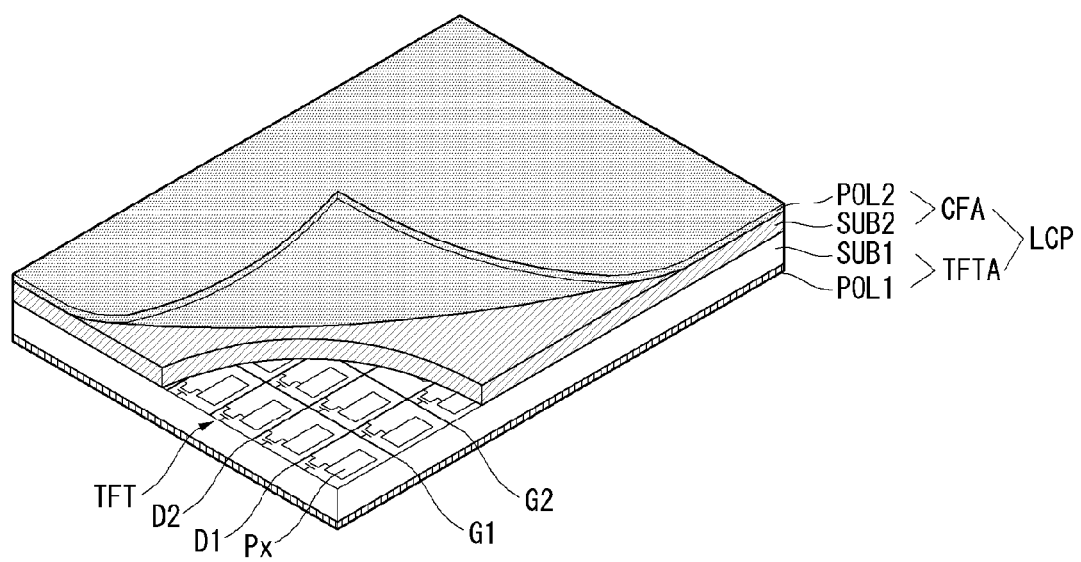
FIG. 2 is a partial exploded perspective view schematically showing a touch sensor integrated type display device according to an exemplary embodiment of the invention.
Figure 3:
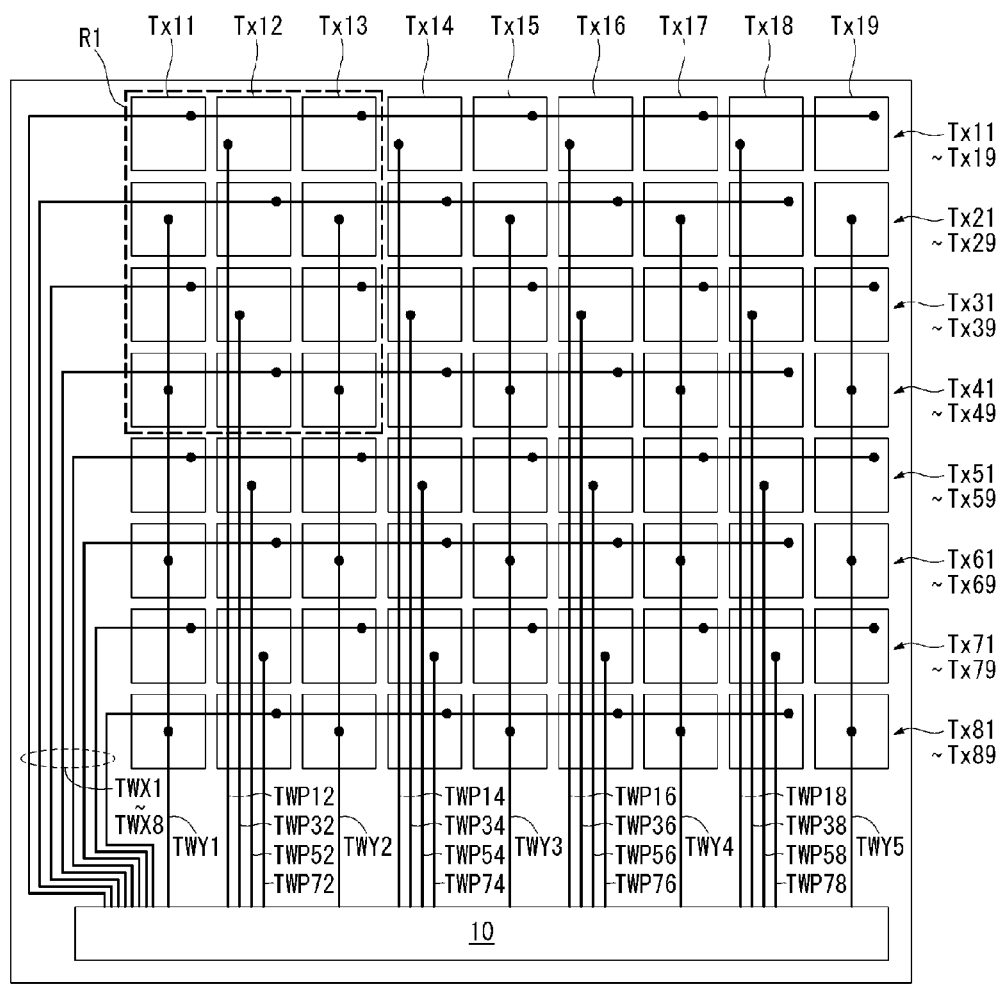
FIG. 3 is a plane view of a touch sensor integrated type display device according to a first embodiment of the invention.

A touch sensor integrated type display device according to an exemplary embodiment of the invention is described with reference to FIGS. 2 and 3. FIG. 2 is a partial exploded perspective view schematically showing a touch sensor integrated type display device according to an exemplary embodiment of the invention. FIG. 3 is a plane view of a touch sensor integrated type display device according to a first embodiment of the invention.

As shown in FIG. 2, the touch sensor integrated type display device according to an embodiment of the invention includes a liquid crystal display panel LCP having a thin film transistor (TFT) array TFTA and a color filter array CFA which are positioned opposite to each other with a liquid crystal layer (not shown) interposed therebetween.

The TFT array TFTA includes a plurality of gate lines G1 and G2 which are formed in parallel in a first direction (for example, x-axis direction) on a first substrate SUB1, a plurality of data lines D1 and D2 which are formed in parallel in a second direction (for example, y-axis direction) to cross over the plurality of gate lines G1 and G2, thin film transistors TFT formed at crossings of the gate lines G1 and G2 and the data lines D1 and D2, a plurality of pixel electrodes Px for charging liquid crystal cells to a data voltage, and a plurality of common electrodes (not shown) positioned opposite the plurality of pixel electrodes Px.

The color filter array CFA includes black matrixes (not shown) and color filters (not shown), which are formed on a second substrate SUB2. Polarizing plates POL1 and POL2 are respectively attached to external surfaces of the first substrate SUB1 and the second substrate SUB2 of the liquid crystal display panel LCP. Alignment layers (not shown) for setting a pre-tilt angle of liquid crystals are respectively formed on inner surfaces of the first and second substrates SUB1 and SUB2 contacting the liquid crystals. A column spacer may be formed between the TFT array TFTA and the color filter array CFA of the liquid crystal display panel LCP to maintain cell gaps of the liquid crystal cells.

The common electrodes are formed on the second substrate SUB2 in a vertical electric field driving mode, such as a twisted nematic (TN) mode and a vertical alignment (VA) mode. Further, the common electrodes are formed on the first substrate SUB1 along with the pixel electrodes Px in a horizontal electric field driving manner, such as an in-plane switching (IPS) mode and a fringe field switching (FFS) mode. In the following description, an embodiment of the invention is described based on a horizontal electric field driving manner, as an example.

Figure 1:
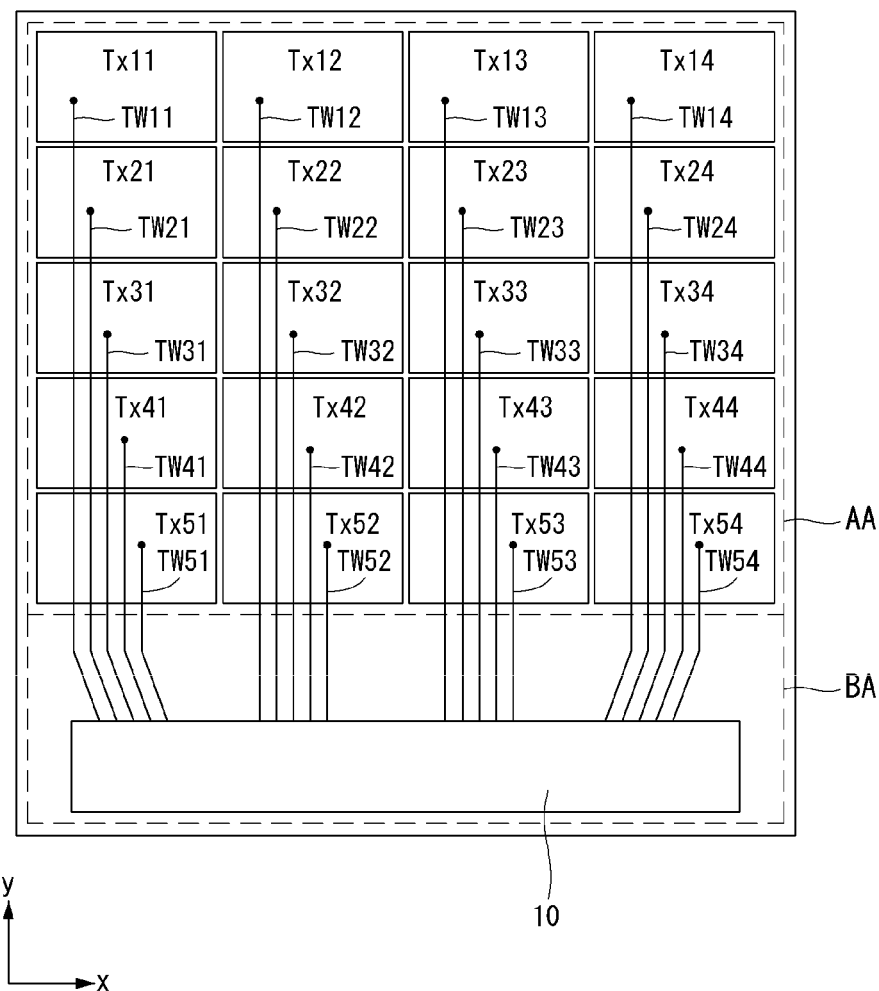
FIG. 1 is a plane view of a related art touch sensor integrated type display device.

In accordance with FIG. 3, the touch sensor integrated type display device according to a first embodiment of the invention may include an active area AA and a bezel area BA positioned outside the active area AA in a manner similar to those shown in FIG. 1. The active area AA is an area, in which touch electrodes serving as common electrodes are formed and data is displayed. The bezel area BA is an area, in which a touch integrated circuit (IC) 100 and various wires including routing wires extending from the active area AA are formed.

The active area AA of the touch sensor integrated type display device includes a plurality of touch electrodes serving as common electrodes (hereinafter abbreviated to "touch electrodes") Tx11-Tx19, Tx21-Tx29, Tx31-Tx39, Tx41-Tx49, Tx51-Tx59, Tx61-Tx69, Tx71-Tx79, and Tx81-Tx89 divided in the first direction (for example, x-axis direction) and the second direction (for example, y-axis direction) crossing the first direction.

The 1-1 touch electrodes Tx11, Tx13, Tx15, Tx17; Tx31, Tx33, Tx35, Tx37; Tx51, Tx53, Tx55, Tx57; and Tx71, Tx73, Tx75, Tx77 disposed on odd-numbered columns of odd-numbered rows of the active area AA are connected to 1-1 touch routing wires TWX1, TWX3, TWX5, and TWX7 arranged in the first direction based on the row. The 2-1 touch electrodes Tx12, Tx14, Tx16, Tx18; Tx32, Tx34, Tx36, Tx38; Tx52, Tx54, Tx56, Tx58; and Tx72, Tx74, Tx76, Tx78 disposed on even-numbered columns of the odd-numbered rows of the active area AA are connected to 2-1 touch routing wires TWP12, TWP14, TWP16, TWP18; TWP32, TWP34, TWP36, TWP38; TWP52, TWP54, TWP56, TWP58; and TWP72, TWP74, TWP76, TWP78 arranged in the second direction, respectively. The 2-1 touch routing wires TWP12, TWP14, TWP16, TWP18; TWP32, TWP34, TWP36, TWP38; TWP52, TWP54, TWP56, TWP58; and TWP72, TWP74, TWP76, TWP78 are arranged in parallel with one another.

Further, the 2-2 touch electrodes Tx21, Tx41, Tx61, Tx81; Tx23, Tx43, Tx63, Tx83; Tx25, Tx45, Tx65, Tx85; Tx27, Tx47, Tx67, Tx87; and Tx29, Tx49, Tx69, Tx89 disposed on odd-numbered columns of even-numbered rows of the active area AA are connected to 2-2 touch routing wires TWY1, TWY2, TWY3, TWY4, and TWY5 arranged in the second direction based on the column. The 1-2 touch electrodes Tx22, Tx24, Tx26, Tx28; Tx42, Tx44, Tx46, Tx48; Tx62, Tx64, Tx66, Tx68; and Tx82, Tx84, Tx86, Tx88 disposed on even-numbered columns of the even-numbered rows of the active area AA are connected to 1-2 touch routing wires TWX2, TWX4, TWX6, and TWX8 arranged in the first direction based on the row. The 1-1 touch routing wires TWX1, TWX3, TWX5, and TWX7 and the 1-2 touch routing wires TWX2, TWX4, TWX6, and TWX8 are alternately positioned and are arranged in parallel with each other. The 2-2 touch routing wires TWY1, TWY2, TWY3, TWY4, and TWY5 are arranged in parallel with the 2-1 touch routing wires TWP12, TWP14, TWP16, TWP18; TWP32, TWP34, TWP36, TWP38; TWP52, TWP54, TWP56, TWP58; and TWP72, TWP74, TWP76, TWP78.

In a related art device, 80 touch electrodes of one line type in a horizontal direction and 45 touch electrodes of another line type in a vertical direction are used in a 15.6-inch display device. Thus, a total of 3600 touch routing wires are required. On the other hand, in the touch sensor integrated type display device according to the first embodiment of the invention shown in FIG. 3, the 40 1-1 touch routing wires, the 40 1-2 touch routing wires, the 920 (=40×23) 2-1 touch routing wires, and the 22 2-2 touch routing wires are used in the 15.6-inch display device. Thus, the total number of touch routing wires used is 1,022. As a result, the embodiment of the invention may reduce the number of touch routing wires by about 65% as compared to the related art.

The touch routing wires connected to the touch electrodes may have arrangements other than FIG. 3. For example, the touch electrodes disposed on the even-numbered columns of the odd-numbered rows may be connected to the 1-1 touch routing wires arranged in the first direction, and the touch electrodes disposed on the odd-numbered columns of the even-numbered rows may be connected to the 1-2 touch routing wires arranged in the first direction. In this instance, the touch electrodes disposed on the odd-numbered columns of the odd-numbered rows may be respectively connected to 2-3 touch routing wires, which are arranged in parallel with one another in the second direction similar to the 2-1 touch routing wires. Further, the touch electrodes disposed on the even-numbered columns of the even-numbered rows may be connected to 2-4 touch routing wires arranged similar to the 2-2 touch routing wires, so that the touch electrodes disposed on the same column are connected to one touch routing wire.

Figure 4:
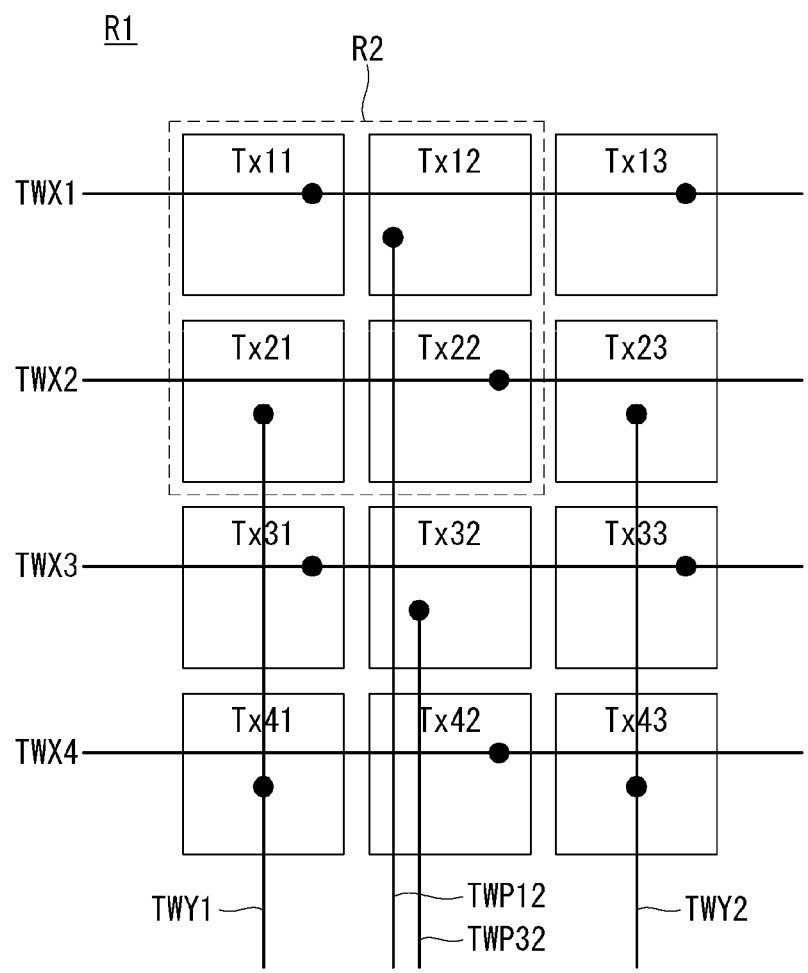
FIG. 4 is a plane view enlarging an area R1 shown in FIG. 3.

Next, an example of a relationship between the touch electrode and the pixel electrode in the touch sensor integrated type display device according to the first embodiment of the invention is described with reference to FIGS. 4 and 5. FIG. 4 is a plane view enlarging an area R1 shown in FIG. 3, and FIG. 5 is a plane view showing in detail an area R2 shown in FIG. 4.

Figure 5:
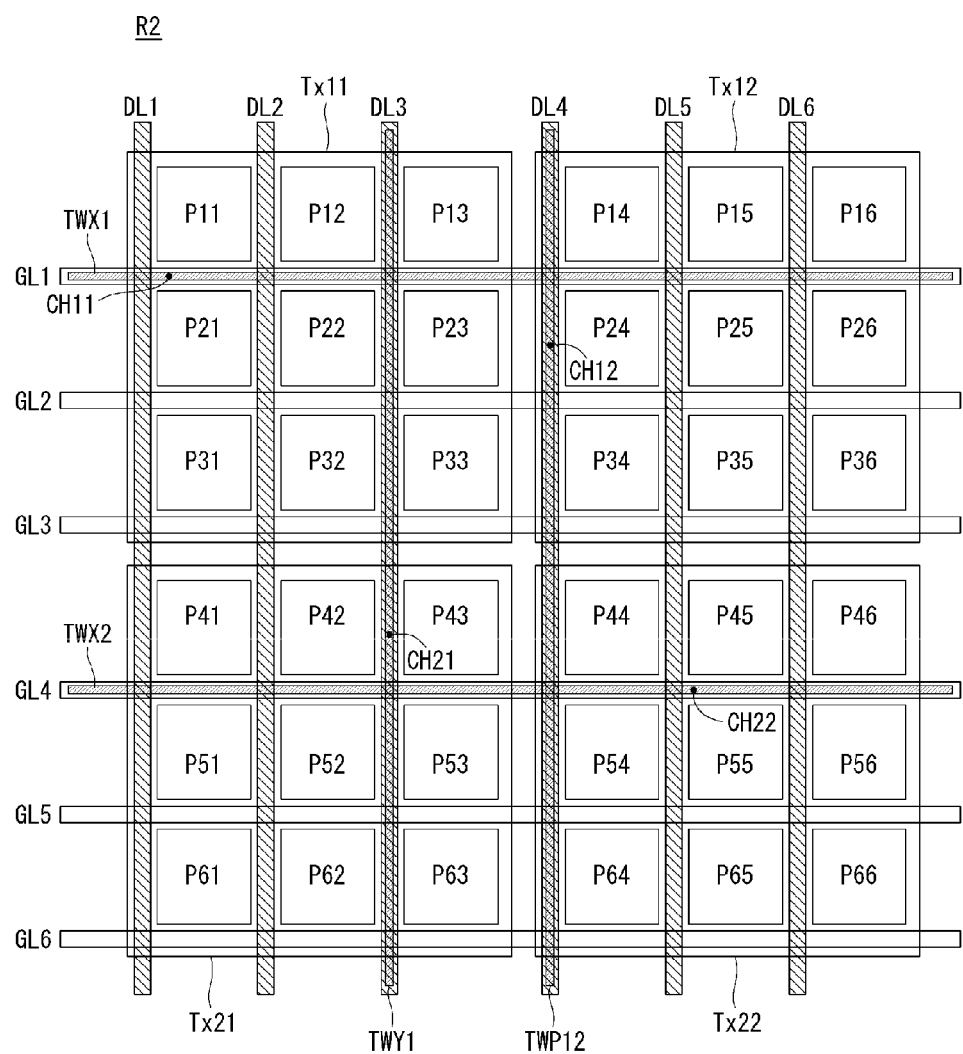
FIG. 5 is a plane view showing in detail an area R2 shown in FIG. 4.

As shown in FIGS. 4 and 5, in the touch sensor integrated type display device according to an embodiment of the invention, 9 pixel electrodes P11-P33; P14-P36; P41-P63; and P44-P66 arranged in the form of 3×3 matrix respectively correspond to the touch electrodes Tx11; Tx12; Tx21; and Tx22. The pixel electrodes P11-P33; P14-P36; P41-P63; and P44-P66 are disposed in areas defined by the plurality of gate lines GL1 to GL6 arranged in the first direction and the plurality of data lines DL1 to DL6 arranged in the second direction crossing the first direction. FIG. 5 shows that the 9 pixel electrodes correspond to each touch electrode, for example, but the embodiment of the invention is not limited thereto. For example, the number of pixel electrodes corresponding to one touch electrode may be adjusted, if necessary or desired.

Figure 6:
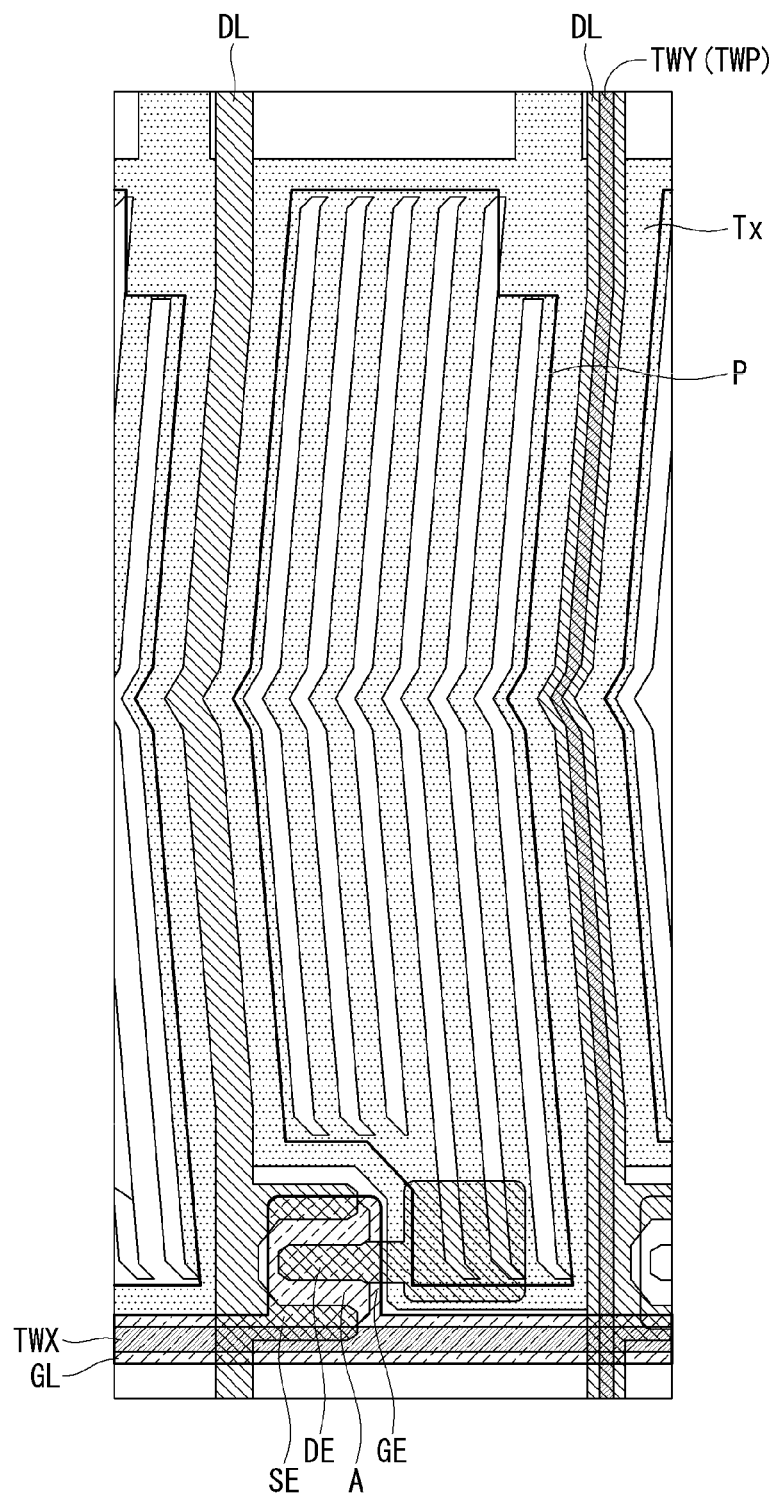
FIG. 6 is a plane view showing an example of an area corresponding to one pixel electrode shown in FIG. 5.
Figure 7A:
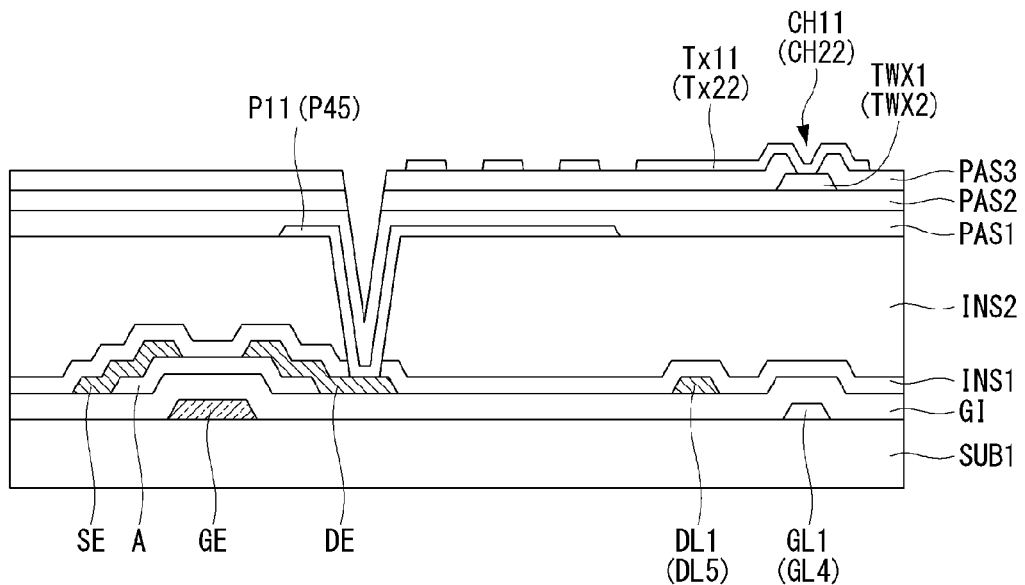
FIG. 7A is a cross-sectional view showing a connection configuration between 1-1 and 1-2 touch routing wires and 1-1 and 1-2 touch electrodes shown in FIG. 5 in a structure shown in FIG. 6.
Figure 7B:
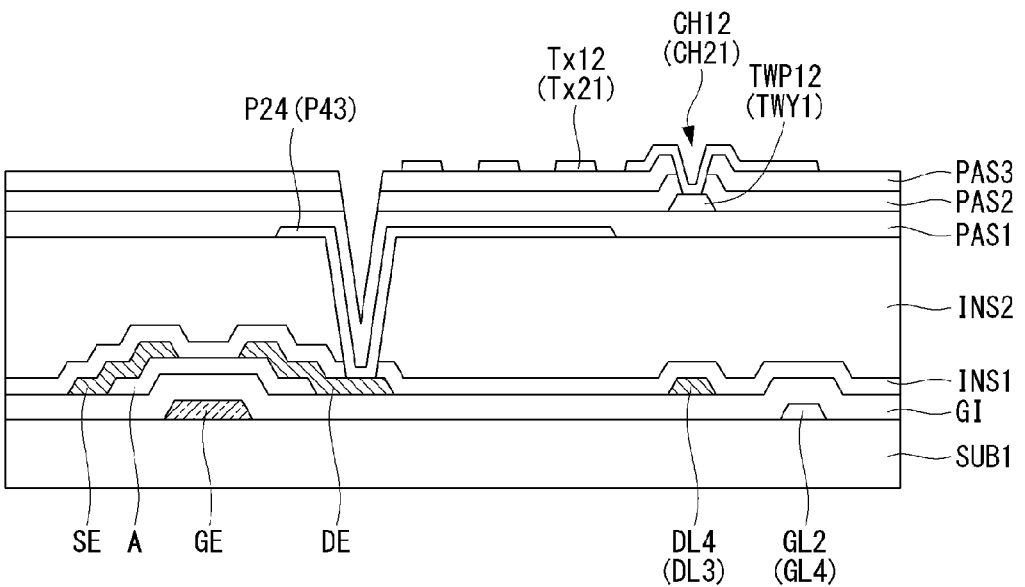
FIG. 7B is a cross-sectional view showing a connection configuration between 2-1 and 2-2 touch routing wires and 2-1 and 2-2 touch electrodes shown in FIG. 5 in a structure shown in FIG. 6.

Next, an example of a connection structure between the touch routing wires and the touch electrodes in the touch sensor integrated type display device according to the first embodiment of the invention is described in detail with reference to FIGS. 6, 7A, and 7B. FIG. 6 is a plane view showing an example of an area corresponding to one pixel electrode shown in FIG. 5. FIG. 7A is a cross-sectional view showing a connection configuration between the 1-1 touch routing wire (or the 1-2 touch routing wire) and the 1-1 touch electrode (or the 1-2 touch electrode) shown in FIG. 5 in a structure shown in FIG. 6. FIG. 7B is a cross-sectional view showing a connection configuration between the 2-1 touch routing wire (or the 2-2 touch routing wire) and the 2-1 touch electrode (or the 2-2 touch electrode) shown in FIG. 5 in the structure shown in FIG. 6. In the following description, an embodiment of the invention is described based on one pixel area for the sake of brevity and ease of reading.

As shown in FIGS. 5 to 7B, the touch sensor integrated type display device according to the embodiment of the invention includes the gate lines GL1 to GL6 and the data lines DL1 to DL6, which are formed to cross over each other on the substrate SUB1 of the TFT array TFTA, thin film transistors (TFTs) formed at crossings of the gate lines GL1 to GL6 and the data lines DL1 to DL6, the pixel electrodes P11 to P66 formed in areas defined by the crossing of the gate lines GL1 to GL6 and the data lines DL1 to DL6, and the touch electrodes Tx11, Tx12, Tx21, and Tx22 serving as the common electrode positioned opposite the pixel electrodes P11 to P66.

The touch electrodes Tx11, Tx12, Tx21, and Tx22 serving as the common electrode perform a function of the common electrode in a display drive and perform a function of the touch electrode in a touch drive.

In the above configuration of the display device, the plurality of gate lines GL1 to GL6 are formed on the substrate SUB1 in parallel with one another, and a gate insulating layer GI is formed on the gate lines GL1 to GL6 to cover the gate lines GL1 to GL6. An active layer A, a source electrode SE, and a drain electrode DE constituting the thin film transistor are formed on the gate insulating layer GI.

Namely, each thin film transistor includes a gate electrode GE extending from each of the gate lines GL1 to GL6 formed on the substrate SUB1, the active layer A formed on the gate insulating layer GI covering each of the gate lines GL1 to GL6 and the gate electrode GE in an area corresponding to the gate electrode GE, and the source electrode SE and the drain electrode DE which are separated from each other on the gate insulating layer GI so as to expose a portion of the active layer A. The source electrode SE extends from each of the data lines DL1 to DL6.

An embodiment of the invention has described, as an example, a thin film transistor having a gate bottom structure, in which the gate electrode is formed under the source and drain electrodes, but is not limited to this example. It should be understood that a thin film transistor having a gate top structure, in which the gate electrode is formed on the source and drain electrodes, may be used. Since the thin film transistor having the gate top structure is known to those in the art, a detailed description thereof will be omitted.

A first insulating layer INS1 covering the thin film transistors and the data lines DL1 to DL6 and a second insulating layer INS2 for planarization are formed on the gate insulating layer GI, on which the thin film transistors and the data lines DL1 to DL6 are formed. The pixel electrodes P11 to P66 are respectively connected to the drain electrodes DE of the thin film transistors through a contact hole passing through the first and second insulating layers INS1 and INS2.

A first passivation layer PAS1 covering the pixel electrodes P11 to P66 is formed. On the first passivation layer PAS1, the 2-1 touch routing wires TWP12, TWP14, TWP16, TWP18; TWP32, TWP34, TWP36, TWP38; TWP52, TWP54, TWP56, TWP58; and TWP72, TWP74, TWP76, TWP78 respectively connected to the 2-1 touch electrodes Tx12, Tx14, Tx16, Tx18; Tx32, Tx34, Tx36, Tx38; Tx52, Tx54, Tx56, Tx58; and Tx72, Tx74, Tx76, Tx78 are formed in parallel with one another, and the 2-2 touch routing wires TWY1, TWY2, TWY3, TWY4, and TWY5 connected to the 2-2 touch electrodes Tx21, Tx41, Tx61, Tx81; Tx23, Tx43, Tx63, Tx83; Tx25, Tx45, Tx65, Tx85; Tx27, Tx47, Tx67, Tx87; and Tx29, Tx49, Tx69, Tx89 are formed in parallel with one another. FIG. 7B shows the 2-1 touch routing wire TWP12 as an example of the 2-1 touch routing wires and the 2-2 touch routing wire TWY1 as an example of the 2-2 touch routing wires. The 2-2 touch routing wires TWY1, TWY2, TWY3, TWY4, and TWY5 are configured so that each of the 2-2 touch routing wires is commonly connected to all of the 2-2 touch electrodes positioned on the same column, unlike the 2-1 touch routing wires.

A second passivation layer PAS2 is formed on the first passivation layer PAS1 to cover the 2-1 touch routing wires TWP12, TWP14, TWP16, TWP18; TWP32, TWP34, TWP36, TWP38; TWP52, TWP54, TWP56, TWP58; and TWP72, TWP74, TWP76, TWP78 and the 2-2 touch routing wires TWY1, TWY2, TWY3, TWY4, and TWY5. On the second passivation layer PAS2, the 1-1 touch routing wires TWX1, TWX3, TWX5, and TWX7 connecting the 1-1 touch electrodes Tx11, Tx13, Tx15, Tx17; Tx31, Tx33, Tx35, Tx37; Tx51, Tx53, Tx55, Tx57; and Tx71, Tx73, Tx75, Tx77 positioned on the same row based on the row and the 1-2 touch routing wires TWX2, TWX4, TWX6, and TWX8 connecting the 1-2 touch electrodes Tx22, Tx24, Tx26, Tx28; Tx42, Tx44, Tx46, Tx48; Tx62, Tx64, Tx66, Tx68; and Tx82, Tx84, Tx86, Tx88 positioned on the same row based on the row are formed. FIG. 7A shows the 1-1 touch routing wire TWX1 as an example of the 1-1 touch routing wires and the 1-2 touch routing wire TWX2 as an example of the 1-2 touch routing wires.

A third passivation layer PAS3 is formed on the second passivation layer PAS2 to cover the 1-1 touch routing wires TWX1, TWX3, TWX5, and TWX7 and the 1-2 touch routing wires TWX2, TWX4, TWX6, and TWX8. As shown in FIG. 3, on the third passivation layer PAS3, the 1-1 touch electrodes Tx11, Tx13, Tx15, Tx17; Tx31, Tx33, Tx35, Tx37; Tx51, Tx53, Tx55, Tx57; and Tx71, Tx73, Tx75, Tx77, the 1-2 touch electrodes Tx22, Tx24, Tx26, Tx28; Tx42, Tx44, Tx46, Tx48; Tx62, Tx64, Tx66, Tx68; and Tx82, Tx84, Tx86, Tx88, the 2-1 touch electrodes Tx12, Tx14, Tx16, Tx18; Tx32, Tx34, Tx36, Tx38; Tx52, Tx54, Tx56, Tx58; and Tx72, Tx74, Tx76, Tx78, and the 2-2 touch electrodes Tx21, Tx41, Tx61, Tx81; Tx23, Tx43, Tx63, Tx83; Tx25, Tx45, Tx65, Tx85; Tx27, Tx47, Tx67, Tx87; and Tx29, Tx49, Tx69, Tx89 are formed.

The 1-1 touch electrodes Tx11, Tx13, Tx15, Tx17; Tx31, Tx33, Tx35, Tx37; Tx51, Tx53, Tx55, Tx57; and Tx71, Tx73, Tx75, Tx77 are formed on the second passivation layer PAS2 through a contact hole CH11 passing through the third passivation layer PAS3 and are connected to the 1-1 touch routing wires TWX1, TWX3, TWX5, and TWX7, which are arranged in parallel with one another in the first direction, based on the row (refer to FIGS. 3 and 7A). The 1-2 touch electrodes Tx22, Tx24, Tx26, Tx28; Tx42, Tx44, Tx46, Tx48; Tx62, Tx64, Tx66, Tx68; and Tx82, Tx84, Tx86, Tx88 are formed on the second passivation layer PAS2 through a contact hole CH22 passing through the third passivation layer PAS3 and are connected to the 1-2 touch routing wires TWX2, TWX4, TWX6, and TWX8, which are arranged in parallel with one another in the first direction, based on the row (refer to FIGS. 3 and 7A).

The 2-1 touch electrodes Tx12, Tx14, Tx16, Tx18; Tx32, Tx34, Tx36, Tx38; Tx52, Tx54, Tx56, Tx58; and Tx72, Tx74, Tx76, Tx78 are formed on the first passivation layer PAS1 through a contact hole CH12 passing through the second and third passivation layers PAS2 and PAS3 and are respectively connected to the 2-1 touch routing wires TWP12, TWP14, TWP16, TWP18; TWP32, TWP34, TWP36, TWP38; TWP52, TWP54, TWP56, TWP58; and TWP72, TWP74, TWP76, TWP78, which are arranged in parallel with one another in the second direction crossing the first direction (refer to FIGS. 3 and 7B). The 2-2 touch electrodes Tx21, Tx41, Tx61, Tx81; Tx23, Tx43, Tx63, Tx83; Tx25, Tx45, Tx65, Tx85; Tx27, Tx47, Tx67, Tx87; and Tx29, Tx49, Tx69, Tx89 are formed on the first passivation layer PAS1 through a contact hole CH21 passing through the second and third passivation layers PAS2 and PAS3 and are connected to the 2-2 touch routing wires TWY1, TWY2, TWY3, TWY4, and TWY5, which are arranged in parallel with one another in the second direction, based on the column (refer to FIGS. 3 and 7B).

Figure 8:
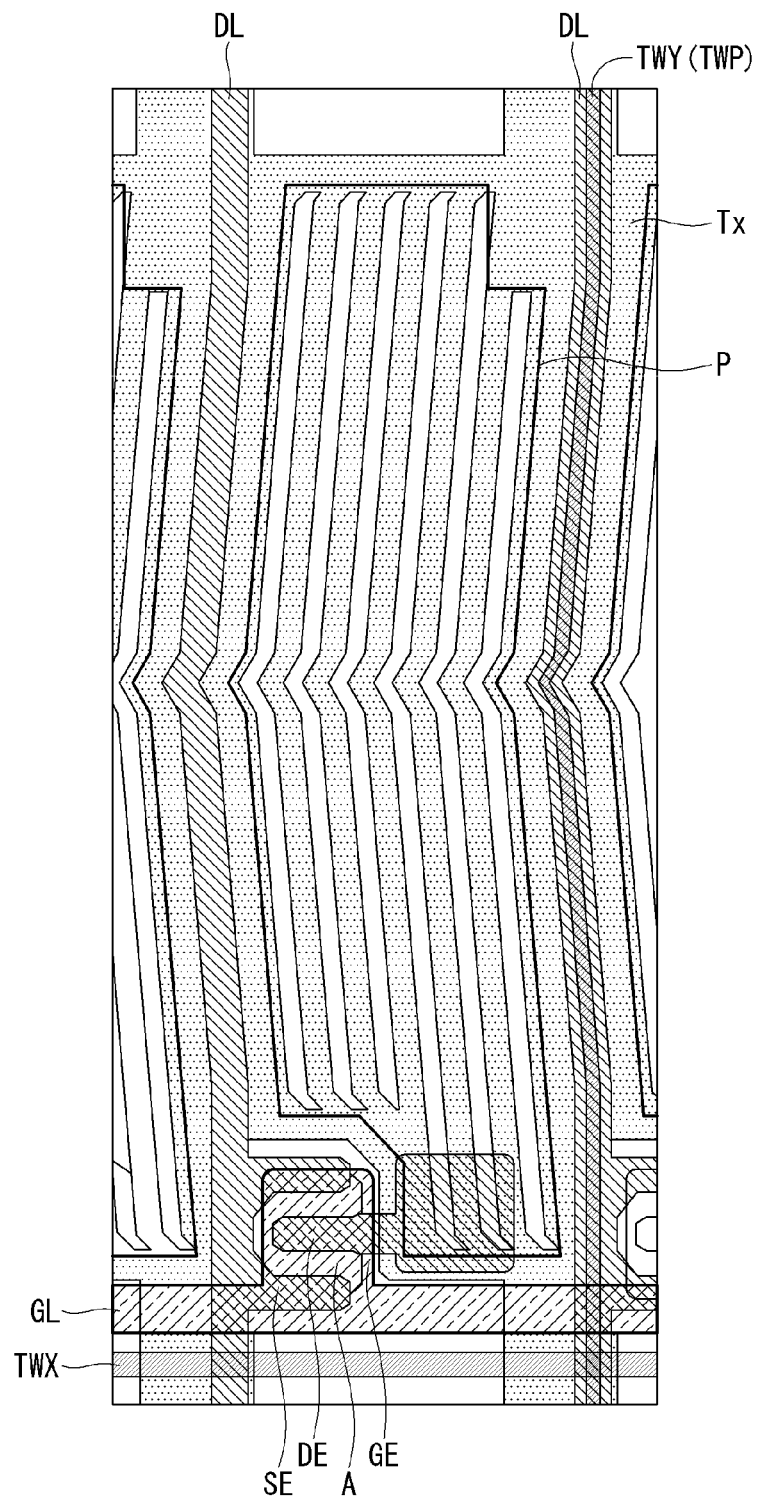
FIG. 8 is a plane view showing another example of an area corresponding to one pixel electrode shown in FIG. 5.
Figure 9A:
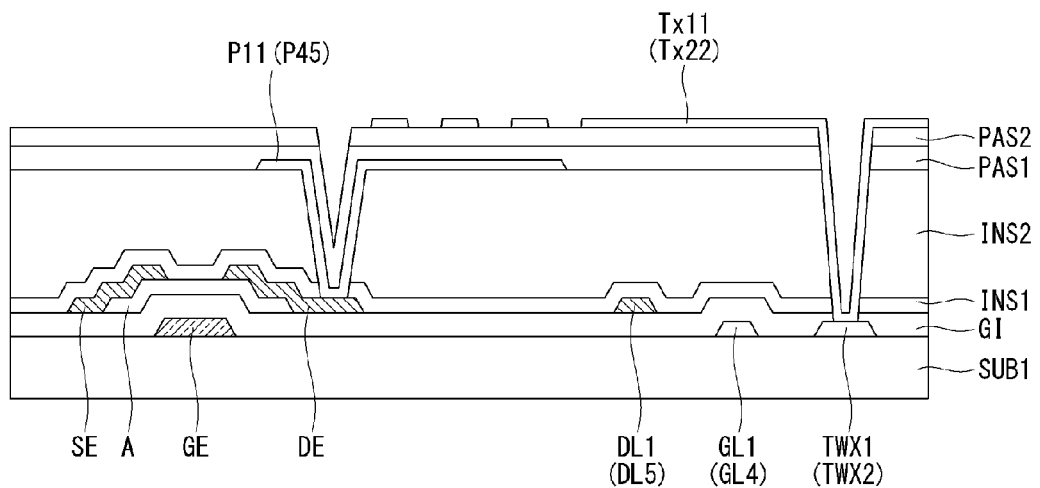
FIG. 9A is a cross-sectional view showing a connection configuration between 1-1 and 1-2 touch routing wires and 1-1 and 1-2 touch electrodes shown in FIG. 5 in a structure shown in FIG. 8.
Figure 9B:
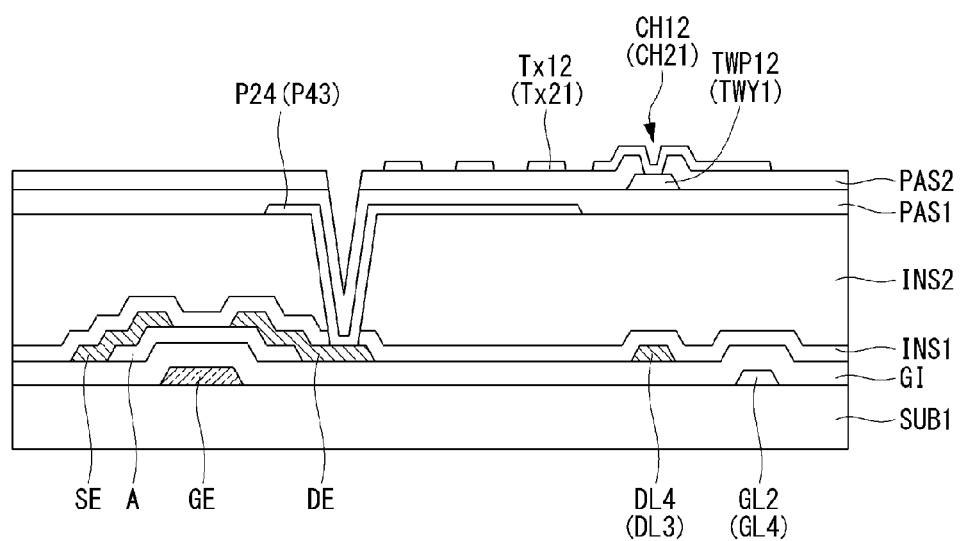
FIG. 9B is a cross-sectional view showing a connection configuration between 2-1 and 2-2 touch routing wires and 2-1 and 2-2 touch electrodes shown in FIG. 5 in a structure shown in FIG. 8.

Next, another example of a connection structure between the touch routing wires and the touch electrodes in the touch sensor integrated type display device according to the first embodiment of the invention is described in detail with reference to FIGS. 8, 9A, and 9B. FIG. 8 is a plane view showing another example of an area corresponding to one pixel electrode shown in FIG. 5. FIG. 9A is a cross-sectional view showing a connection configuration between the 1-1 and 1-2 touch routing wires and the 1-1 and 1-2 touch electrodes shown in FIG. 5 in a structure shown in FIG. 8. FIG. 9B is a cross-sectional view showing a connection configuration between the 2-1 and 2-2 touch routing wires and the 2-1 and 2-2 touch electrodes shown in FIG. 5 in the structure shown in FIG. 8. In the following description, an embodiment of the invention is described based on one pixel area for the sake of brevity and ease of reading.

The example shown in FIGS. 8 to 9B is substantially similar to the example shown in FIGS. 6 to 7B, except a formation location of the 1-1 and 1-2 touch routing wires, the connection configuration between the 1-1 and 1-2 touch routing wires and the 1-1 and 1-2 touch electrodes, and the removal of the third passivation layer. Thus, a difference between the example shown in FIGS. 8 to 9B and the example shown in FIGS. 6 to 7B is described below.

As shown in FIGS. 8 to 9B, in the touch sensor integrated type display device according to the embodiment of the invention, the 1-1 and 1-2 touch routing wires TWX1, TWX3, TWX5, TWX7; and TWX2, TWX4, TWX6, TWX8 are arranged in parallel with each other in the first direction, do not overlap the gate line GL, and are formed on the substrate corresponding to the same level layer as the gate line GL. Thus, the 1-1 and 1-2 touch routing wires TWX1, TWX3, TWX5, TWX7; and TWX2, TWX4, TWX6, TWX8 shown in FIGS. 8 to 9B are different from the example shown in FIGS. 6 to 7B overlapping the gate line GL.

The 1-1 touch routing wires TWX1, TWX3, TWX5, and TWX7 connect the 1-1 touch electrodes Tx11, Tx13, Tx15, Tx17; Tx31, Tx33, Tx35, Tx37; Tx51, Tx53, Tx55, Tx57; and Tx71, Tx73, Tx75, Tx77, which are disposed on the odd-numbered columns of the odd-numbered rows, based on the row through a contact hole passing through the gate insulating layer GI, the first and second insulating layers INS1 and INS2, and the first to third passivation layers PAS1 to PAS3. Further, the 1-2 touch routing wires TWX2, TWX4, TWX6, and TWX8 connect the 1-2 touch electrodes Tx22, Tx24, Tx26, Tx28; Tx42, Tx44, Tx46, Tx48; Tx62, Tx64, Tx66, Tx68; and Tx82, Tx84, Tx86, Tx88, which are disposed on the even-numbered columns of the even-numbered rows, based on the row through a contact hole passing through the gate insulating layer GI, the first and second insulating layers INS1 and INK, and the first and second passivation layers PAS1 and PAS2.

Because the connection configuration between the 2-1 and 2-2 touch electrodes and the 2-1 and 2-2 touch routing wires was described above with reference to FIGS. 6 to 7B, a further description thereof may be omitted.

Figure 10:
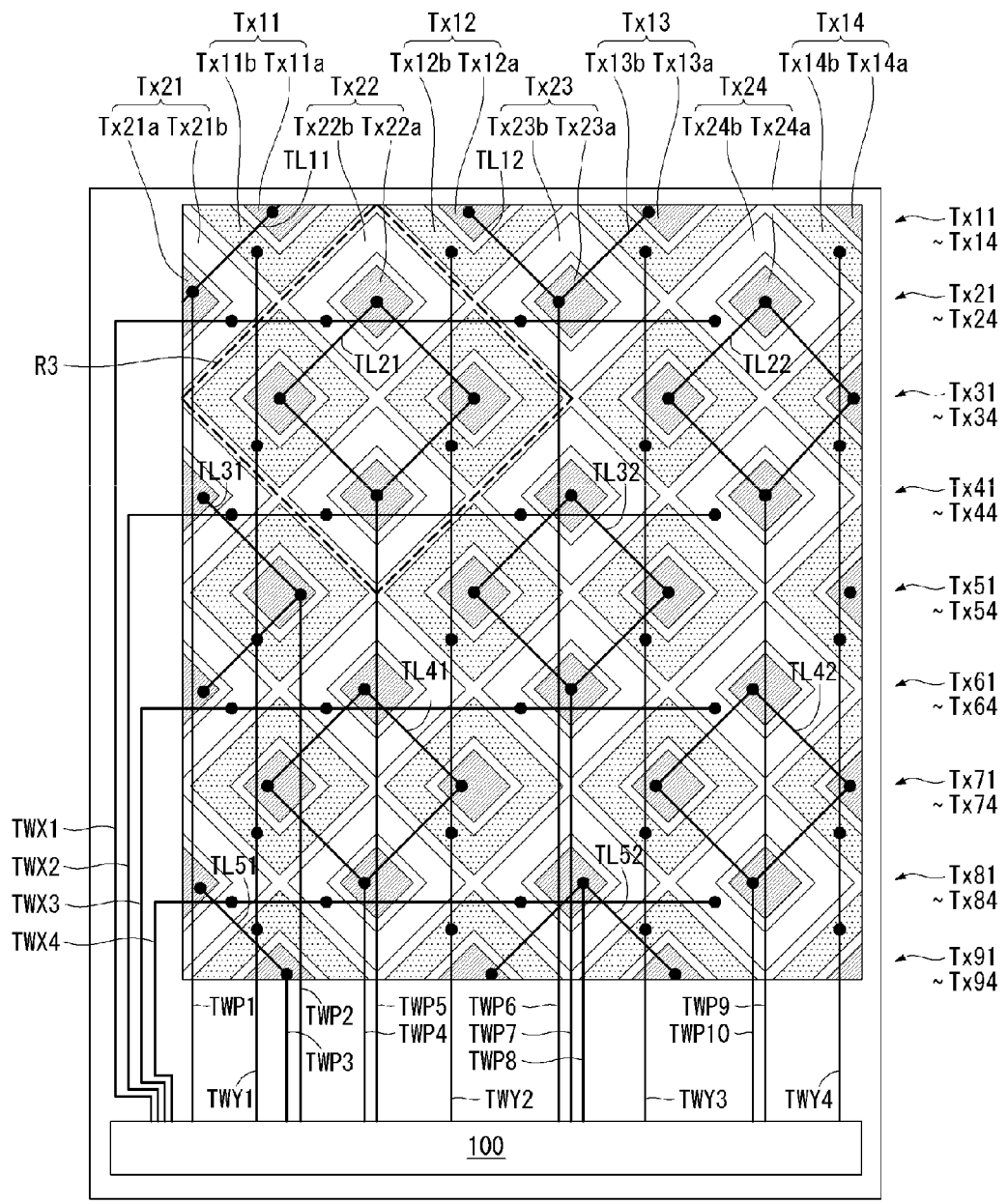
FIG. 10 is a plane view of a touch sensor integrated type display device according to a second embodiment of the invention.
Figure 11:
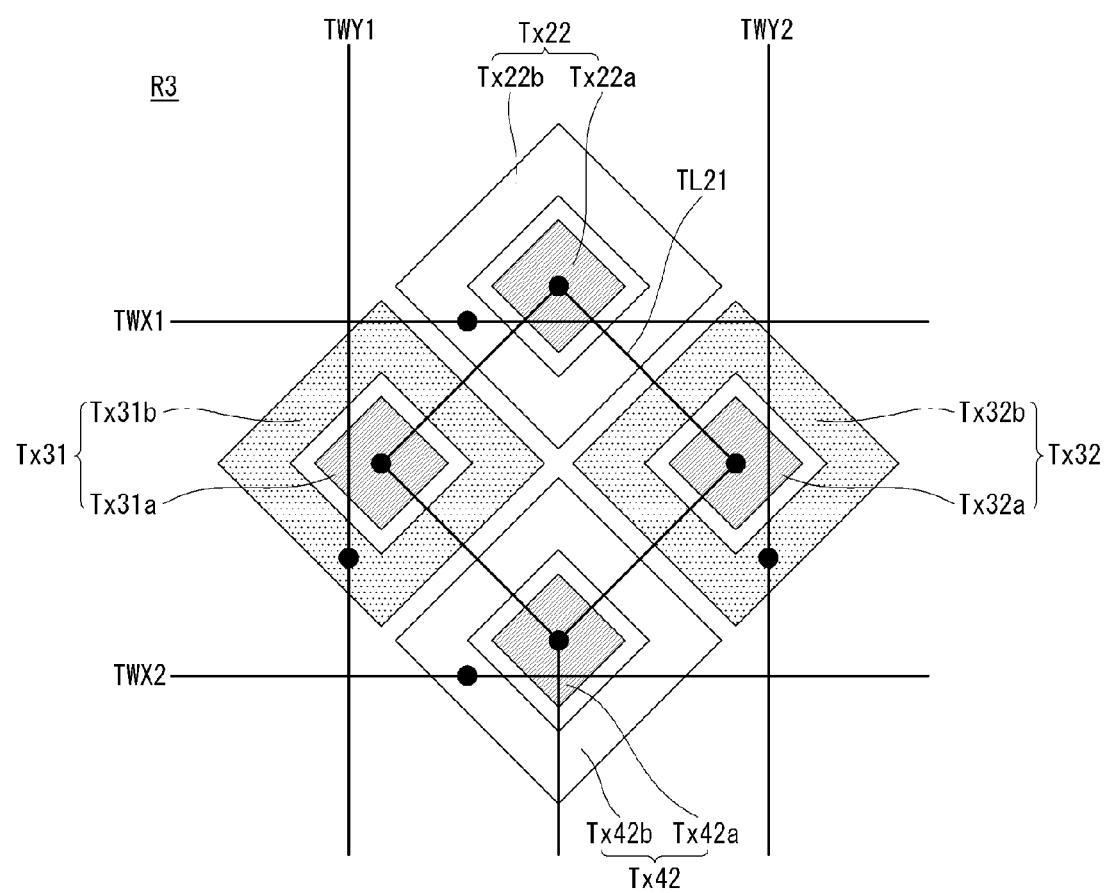
FIG. 11 is a plane view enlarging an area R3 shown in FIG. 10.

Next, a touch sensor integrated type display device according to a second embodiment of the invention is described with reference to FIGS. 10 and 11. FIG. 10 is a plane view of the touch sensor integrated type display device according to the second embodiment of the invention. FIG. 11 is a plane view enlarging an area R3 shown in FIG. 10.

As shown in FIG. 10, the touch sensor integrated type display device according to a second embodiment of the invention includes an active area AA and a bezel area BA positioned outside the active area AA. The active area AA is an area, in which touch electrodes serving as common electrodes are formed and data is displayed. The bezel area BA is an area, in which a touch IC 100 and various wires including routing wires extending from the active area AA are formed.

The active area AA of the touch sensor integrated type display device according to the second embodiment of the invention includes a plurality of touch electrodes serving as common electrodes (hereinafter abbreviated to "touch electrodes") Tx11-Tx14, Tx21-Tx24, Tx31-Tx34, Tx41-Tx44, Tx51-Tx54, Tx61-Tx64, Tx71-Tx74, Tx81-Tx84, and Tx91-Tx94 divided in an oblique direction inclined from a first direction (for example, x-axis direction or y-axis direction) by a predetermined angle and in an oblique direction inclined from a second direction (for example, y-axis direction or x-axis direction) by a predetermined angle. Each of the touch electrodes Tx11-Tx14, Tx21-Tx24, Tx31-Tx34, Tx41-Tx44, Tx51-Tx54, Tx61-Tx64, Tx71-Tx74, Tx81-Tx84, and Tx91-Tx94 includes a first touch electrode of a rectangular shape and a second touch electrode of a frame shape surrounding the first touch electrode.

For example, as shown in FIG. 11 enlarging a partial area R3 of FIG. 10, the touch electrode Tx22 includes a first touch electrode Tx22a and a second touch electrode Tx22b, the touch electrode Tx31 includes a first touch electrode Tx31a and a second touch electrode Tx31b, the touch electrode Tx32 includes a first touch electrode Tx32a and a second touch electrode Tx32b, and the touch electrode Tx42 includes a first touch electrode Tx42a and a second touch electrode Tx42b. As described above, all of the touch electrodes each include the first touch electrode and the second touch electrode.

The adjacent first touch electrodes Tx11a-Tx14a, Tx21a-Tx24a, Tx31a-Tx34a, Tx41a-Tx44a, Tx51a-Tx54a, Tx61a-Tx64a, Tx71a-Tx74a, Tx81a-Tx84a, and Tx91a-Tx94a are connected by touch link lines TL11, TL12, TL21, TL22, TL31, TL32, TL41, TL42, TL51, and TL52 to form a quadrangle, for example. FIG. 11 shows an example where the four first touch electrodes are connected by one touch link line. However, in the example shown in FIG. 11, three or less first touch electrodes in the first touch electrodes Tx11a, Tx12a, Tx13a, Tx21a, Tx23a, Tx34a, Tx41a, Tx51a, Tx61a, Tx81a, Tx83a, Tx91a, Tx92a, and Tx93a (refer to FIG. 10) positioned at edges and corners of the active area AA are connected to one another depending on a disposition relationship.

The touch link lines TL11, TL12, TL21, TL22, TL31, TL32, TL41, TL42, TL51, and TL52 grouping the first touch electrodes Tx11a-Tx14a, Tx21a-Tx24a, Tx31a-Tx34a, Tx41a-Tx44a, Tx51a-Tx54a, Tx61a-Tx64a, Tx71a-Tx74a, Tx81a-Tx84a, and Tx91a-Tx94a are respectively connected to first touch routing wires TWP1, TWP2, . . . , and TWP10.

The embodiment of the invention shows an example where the four first touch electrodes are connected to one another by one touch link line to form the quadrangle through their connection line, but is not limited thereto. Embodiments of the invention may form a triangle, a polygon, a star shape, etc., if necessary or desired.

The second touch electrodes Tx11b, Tx31b, Tx51b, Tx71b, Tx91b; Tx12b, Tx32b, Tx52b, Tx72b, Tx92b; Tx13b, Tx33b, Tx53b, Tx73b, Tx93b; and Tx14b, Tx34b, Tx54b, Tx74b, Tx94b positioned on odd-numbered rows are connected to one another through second touch routing wires TWY1, TWY21, TWY3, and TWY4, which are arranged in parallel with one another in the second direction, based on the column. The second touch electrodes Tx21b, Tx22b, Tx23b, Tx24b; Tx41b, Tx42b, Tx43b, Tx44b; Tx61b, Tx62b, Tx63b, Tx64b; and Tx81b, Tx82b, Tx83b, Tx84b positioned on even-numbered rows are connected to one another through third touch routing wires TWX1, TWX2, TWX3, and TWX4, which are arranged in parallel with one another in the first direction, based on the row.

Unlike the illustrated embodiment of the invention, the second touch electrodes positioned on the odd-numbered rows may be connected to one another through the touch routing wires, which are arranged in parallel with one another in the first direction, based on the row. Further, the second touch electrodes positioned on the even-numbered rows may be connected to one another through the touch routing wires, which are arranged in parallel with one another in the second direction, based on the column.

In the second embodiment of the invention, the first to third touch routing wires TWP2, . . . , TWP10; TWY1, TWY2, TWY3, TWY4; and TWX1, TWX2, TWX3, TWX4 are connected to the touch IC 100, and thus supplies a common voltage to the touch IC 100 in a display drive and supplies a touch driving voltage to the touch IC 100 in a touch drive. Then, the first to third touch routing wires TWP2, . . . , TWP10; TWY1, TWY2, TWY3, TWY4; and TWX1, TWX2, TWX3, TWX4 sense changes in a capacitance of each touch electrode and supplies the sensed changes to the touch IC 100.

The second embodiment of the invention may be similar to the first embodiment of the invention, except that each touch electrode includes the first touch electrode and the second touch electrode and is arranged in the oblique direction, and the touch link lines are added. The second embodiment of the invention is may be similar to the first embodiment of the invention, except that the third touch routing wires are formed by additionally forming a passivation layer on a layer different from a formation layer of the 1-1 and 1-2 touch routing wires and the 2-1 and 2-2 touch routing wires so as to group the first touch electrodes into several units, forming the touch link lines on the added passivation layer, and forming a contact hole. Thus, a further description may be omitted so as to avoid duplication of the description.

Figure 12:
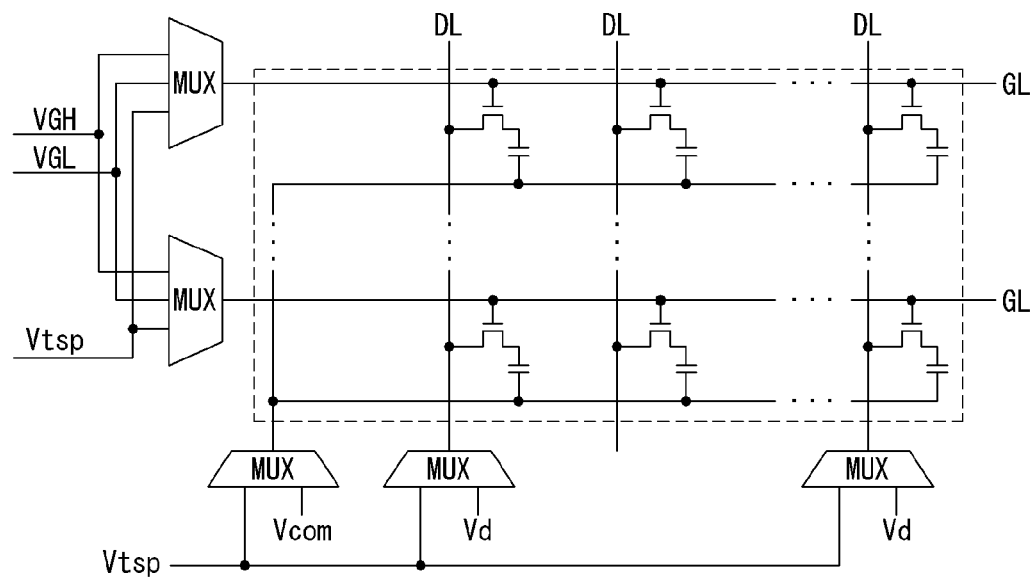
FIG. 12 illustrates an operation of a display driving period and an operation of a touch driving period in the touch sensor integrated type display device according to the first and second embodiments of the invention.
Figure 12:
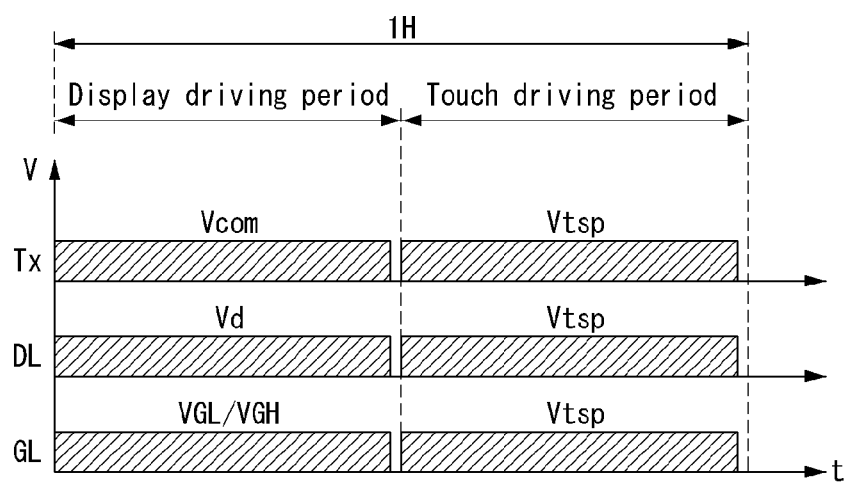

Next, a drive of the touch sensor integrated type display device according to the first and second embodiments of the invention is described with reference to FIG. 12. FIG. 12 illustrates an operation of a display driving period and an operation of a touch driving period in the touch sensor integrated type display device according to the first and second embodiments of the invention.

As shown in FIG. 12, the touch sensor integrated type display device according to the first and second embodiments of the invention time-divides each horizontal period 1H into a display driving period and a touch driving period. During the display driving period, a common voltage Vcom is supplied to the touch electrodes Tx serving as the common electrode, a turn-on voltage VHL of the pixel is sequentially applied to the gate lines GL by a multiplexer MUX (a turn-off voltage VGL of the pixel is applied to the remaining gate lines), and a data voltage Vd is supplied to the data lines DL by the multiplexer MUX. Next, during the touch driving period, a touch driving voltage Vtsp is supplied to all of the touch electrodes Tx by the multiplexer MUX, and a voltage having the same frequency and the same magnitude as the touch driving voltage Vtsp is supplied to all of the gate lines GL and the data lines DL by the multiplexer MUX.

As described above, the touch sensor integrated type display device according to the embodiments of the invention may supply a voltage having the same frequency and/or the same magnitude as the touch driving voltage supplied to the touch electrodes to the gate lines and the data lines during the touch driving period, thereby preventing a parasitic capacitance from being generated between the touch routing wires and the gate lines and between the touch routing wires and the data lines. Thus, the touch sensor integrated type display device according to the embodiments of the invention may prevent a reduction in the touch sensitivity resulting from the parasitic capacitance.

Further, because the touch sensor integrated type display device according to the first and second embodiments of the invention may markedly reduce the number of touch routing wires, the number of touch routing wires connected to the touch electrodes may be markedly reduced. Thus, the embodiments of the invention may prevent an increase in the size of the touch IC resulting from the large-sized display device and may reduce the manufacturing cost.

It will be apparent to those skilled in the art that various modifications and variations can be made in the touch sensor integrated type display device of the present invention without departing from the spirit or scope of the invention. Thus, it is intended that the present invention cover the modifications and variations of this invention provided they come within the scope of the appended claims and their equivalents.

What is claimed is:

1. A touch sensor integrated type display device, comprising:
   a plurality of gate lines and a plurality of data lines which are arranged crossing each other;
   a plurality of pixel electrodes respectively disposed in pixel areas defined by the crossing of the plurality of gate lines and the plurality of data lines;
   a plurality of touch electrodes arranged in a matrix with a row direction and a column direction, each touch electrode overlapping at least one respective pixel electrode;
   a 1-1 touch routing wire arranged in the row direction and configured to connect 1-1 touch electrodes among the plurality of touch electrodes disposed in a single row and only one of odd numbered columns and even-numbered columns;
   a plurality of 2-1 touch routing wires arranged in the column direction and respectively connected to 2-1 touch electrodes disposed in only one of odd numbered rows and even numbered rows such that the rows includes the row of the 1-1 touch routing wire and a single column of the other one of the odd numbered columns and the even-numbered columns that does not include any column of the 1-1 electrodes;
   a 1-2 touch routing wire arranged in parallel with the 1-1 touch routing wire and configured to connect 1-2 touch electrodes disposed in a single row adjacent to the row of the 1 1 touch electrodes and only the other one of the odd-numbered columns and the even numbered columns that does not include the columns of the 1-1 touch electrodes; and
   at least one 2-2 touch routing wire arranged in parallel with the 2-1 touch routing wire and configured to connect 2-2 touch electrodes disposed in only the other one of the even numbered rows and the odd numbered rows such that the rows do not include the row of the 1-1 touch electrode and a single column of the same one of the odd-numbered columns and the even-numbered columns that includes one of the columns of the 1-1 touch electrodes.

2. The touch sensor integrated type display device of claim 1, wherein the 1-1 touch electrodes and the 2-1 touch electrodes are alternately disposed on a same row, and the 1-2 touch electrodes and the 2-2 touch electrodes are alternately disposed on another same row.

3. The touch sensor integrated type display device of claim 2, wherein each of the plurality of 2-2 touch routing wires connects the 2-2 touch electrodes disposed on a same column.

4. The touch sensor integrated type display device of claim 1, further comprising a plurality of thin film transistors disposed at crossings of the plurality of gate lines and the plurality of data lines, wherein the pixel electrode is disposed on a gate insulating layer covering the plurality of thin film transistors and is connected to a drain electrode of the thin film transistor, wherein the 2-1 and 2-2 touch routing wires are disposed on a first passivation layer covering and parallel to the pixel electrode, wherein the 1-1 and 1-2 touch routing wires are disposed on a second passivation layer covering the 2-1 and 2-2 touch routing wires, and wherein the plurality of touch electrodes are disposed on a third passivation layer covering the 1-1 and 1-2 touch routing wires.

5. The touch sensor integrated type display device of claim 4, wherein the 1-1 touch routing wire is connected to the 1-1 touch electrode through a first contact hole passing through the third passivation layer, and the 1-2 touch routing wire is connected to the 1-2 touch electrode through a second contact hole passing through the third passivation layer.

6. The touch sensor integrated type display device of claim 5, wherein the 2-1 touch routing wire is connected to the 2-1 touch electrode through a third contact hole passing through the second and third passivation layers, and the 2-2 touch routing wire is connected to the 2-2 touch electrode through a fourth contact hole passing through the second and third passivation layers.

7. The touch sensor integrated type display device of claim 1, further comprising a plurality of thin film transistors disposed at crossings of the plurality of gate lines and the plurality of data lines, wherein the 1-1 and 1-2 touch routing wires are disposed on a same layer as the gate lines in parallel with the gate lines, wherein the data lines are disposed on a gate insulating layer covering the gate lines formed on a substrate and the 1-1 and 1-2 touch routing wires, wherein the pixel electrode is connected to a drain electrode of the thin film transistor formed on the same layer as the data lines, wherein the 2-1 and 2-2 touch routing wires are disposed on a first passivation layer covering and parallel to the pixel electrode, wherein the plurality of touch electrodes are disposed on a second passivation layer covering the 1-1 and 1-2 touch routing wires, wherein the 1-1 touch routing wire is connected to the 1-1 touch electrode through a first contact hole, and the 1-2 touch routing wire is connected to the 1-2 touch electrode through a second contact hole, wherein the 2-1 touch routing wire is connected to the 2-1 touch electrode through a third contact hole, and the 2-2 touch routing wire is connected to the 2-2 touch electrode through a fourth contact hole.

8. The touch sensor integrated type display device of claim 1, wherein a common voltage is supplied to the plurality of touch electrodes in a display driving period, wherein in a touch driving period before or after the display driving period, a touch driving voltage is supplied to the plurality of touch electrodes, and a voltage having a same frequency and a same magnitude as the touch driving voltage is supplied to the plurality of gate lines and the plurality of data lines.

9. A touch sensor integrated type display device, comprising:

a plurality of gate lines and a plurality of data lines which are arranged crossing each other;

a plurality of pixel electrodes respectively disposed in pixel areas defined by the crossing of the plurality of gate lines and the plurality of data lines;

a plurality of touch electrodes arranged in an oblique direction of a row direction and an oblique direction of a column direction, each touch electrode overlapping at least one respective pixel electrode, and including a first touch electrode and a second touch electrode completely surrounding the first touch electrode;

a plurality of touch link lines configured to connect a predetermined number of first touch electrodes and form a plurality of groups of the first touch electrodes;

a plurality of first touch routing wires which are respectively connected to the plurality of touch link lines and are arranged in the column direction;

a plurality of second touch routing wires which connect the second touch electrodes arranged in respective columns of only one of odd-numbered columns and even-numbered columns among the plurality of touch electrodes and are arranged in parallel with one another in the column direction; and a third touch routing wire which connects the second touch electrodes on one row arranged in columns of only the other one of the odd-numbered columns and the even-numbered columns among the plurality of touch electrodes that are not in the columns of the second touch routing wires.

10. The touch sensor integrated type display device of claim 9, wherein each of the plurality of touch link lines are electrically connected to define one of a triangle, a quadrangle, a polygon, and a star shape.

11. A touch sensor integrated type display device, comprising:

a plurality of gate lines and a plurality of data lines which are arranged crossing each other;

a plurality of pixel electrodes respectively disposed in pixel areas defined by the crossing of the plurality of gate lines and the plurality of data lines;

a plurality of touch electrodes arranged in a matrix with a row direction and a column direction, each touch electrode overlapping at least one respective pixel electrode;

a 1-1 touch routing wire arranged in the row direction configured to connect 1-1 touch electrodes among the plurality of touch electrodes, the 1-1 touch electrodes including only alternating ones of the touch electrodes of one row;

a plurality of 2-1 touch routing wires arranged in the column direction which are connected to respective ones of 2-1 touch electrodes, the 2-1 electrodes including touch electrodes directly between respective ones of the 1-1 touch electrodes as well as alternating ones of the touch electrodes in the column direction;

a 1-2 touch routing wire arranged parallel to the 1-1 touch routing wire and configured to connect 1-2 touch electrodes among the plurality of touch electrodes, the 1-2 touch electrodes including only alternating ones of the touch electrodes of a row other than the row of the 1-1 touch electrodes such that 1-1 touch electrodes and the 2-1 touch electrodes are disposed in respectively different columns; and at least one 2-2 touch routing wire arranged parallel to the 2-1 touch routing wire and configured to connect 2-2 touch electrodes, the 2-2 touch electrodes including only every other touch electrode of a column corresponding to one of the 1-1 touch electrodes such that the 2-2 touch electrodes are in a same row as respective ones of the 1-2 touch electrodes.

\* \* \* \* \*